(12) United States Patent
Lian et al.

(10) Patent No.: US 12,534,063 B2
(45) Date of Patent: Jan. 27, 2026

(54) VEHICLE DRIFT CONTROL METHOD AND SYSTEM, AND VEHICLE

(71) Applicant: BYD COMPANY LIMITED, Shenzhen (CN)

(72) Inventors: Yubo Lian, Shenzhen (CN); Heping Ling, Shenzhen (CN); Mingchuan Shi, Shenzhen (CN); Hongxia Wang, Shenzhen (CN); Luo Fu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/011,786

(22) Filed: Jan. 7, 2025

(65) Prior Publication Data

US 2025/0145148 A1 May 8, 2025

Related U.S. Application Data

(63) Continuation of application No. PCT/CN2023/090698, filed on Apr. 25, 2023.

(30) Foreign Application Priority Data

Jul. 18, 2022 (CN) .......................... 202210845246.3

(51) Int. Cl.
*B60W 30/02* (2012.01)
*B60K 23/08* (2006.01)
*B60W 10/119* (2012.01)

(52) U.S. Cl.
CPC ......... *B60W 30/02* (2013.01); *B60K 23/0808* (2013.01); *B60W 10/119* (2013.01);
(Continued)

(58) Field of Classification Search
CPC ............... B60W 30/02; B60W 10/119; B60W 2540/215; B60W 2520/10;
(Continued)

(56) References Cited

U.S. PATENT DOCUMENTS

2003/0125864 A1\* 7/2003 Banno ................. B60W 10/184
701/84
2019/0337385 A1 11/2019 Lim et al.
(Continued)

FOREIGN PATENT DOCUMENTS

CN 110126831 A 8/2019
CN 111267856 A 6/2020
(Continued)

OTHER PUBLICATIONS

The World Intellectual Property Organization (WIPO) International Search Report for PCT/CN2023/090698 Jul. 8, 2023 6 Pages (including translation).

*Primary Examiner* — Edwin A Young
(74) *Attorney, Agent, or Firm* — Wenye Tan

(57) ABSTRACT

A vehicle drift control method includes obtaining a required whole vehicle torque and state parameters of a vehicle in response to a drift operation instruction of a user. The state parameters include a first vehicle speed, a first yaw rate, and a first mass center sideslip angle. The method also includes determining a front axle torque ratio based on the state parameters; determining a required front axle torque and a required rear axle torque based on the front axle torque ratio and the required whole vehicle torque; and controlling torques of a front axle motor and a rear axle motor based on the required front axle torque and the required rear axle torque respectively.

20 Claims, 6 Drawing Sheets

(52) U.S. Cl.
CPC .. *B60K 2023/0816* (2013.01); *B60W 2520/10* (2013.01); *B60W 2520/14* (2013.01); *B60W 2520/20* (2013.01); *B60W 2540/10* (2013.01); *B60W 2540/12* (2013.01); *B60W 2540/215* (2020.02); *B60W 2720/14* (2013.01); *B60W 2720/20* (2013.01)

(58) Field of Classification Search
CPC ......... B60W 2520/14; B60W 2520/20; B60W 2540/10; B60W 2540/12; B60W 2720/14; B60W 2720/20; B60K 23/0808; B60K 2023/0816
See application file for complete search history.

(56) References Cited

U.S. PATENT DOCUMENTS

| | | | |
|---|---|---|---|
| 2020/0324649 | A1 | 10/2020 | Gully |
| 2022/0041176 | A1* | 2/2022 | Balachandran ..... B60W 50/087 |
| 2022/0080837 | A1 | 3/2022 | Pettersson |
| 2022/0396259 | A1* | 12/2022 | Balachandran ....... B60W 10/20 |

FOREIGN PATENT DOCUMENTS

| | | |
|---|---|---|
| CN | 111824257 A | 10/2020 |
| CN | 114084140 A | 2/2022 |
| KR | 20220026655 A | 3/2022 |
| WO | 2022104601 A1 | 5/2022 |

\* cited by examiner

VEHICLE DRIFT CONTROL METHOD AND SYSTEM, AND VEHICLE

CROSS-REFERENCE TO RELATED APPLICATIONS

The present application is a continuation application of PCT application No. PCT/CN2023/090698, filed on Apr. 25, 2023, which claims priority to Chinese Patent Application No. 202210845246.3, entitled "VEHICLE DRIFT CONTROL METHOD AND SYSTEM, AND VEHICLE" and filed on Jul. 18, 2022. The entire content of all of the above-referenced applications is incorporated herein by reference.

FIELD

The present disclosure relates to the field of vehicle control technologies, and specifically, to a vehicle drift control method and system, and a vehicle.

BACKGROUND

In the related art, a current steering intention of a driver is determined based on a vehicle state detection signal. If the determined current steering intention is that a current wheel turning operation intensifies a current vehicle steering trend, an adjustment scheme of reducing a front axle torque distribution ratio and increasing a rear axle torque distribution ratio is made, or if the determined current steering intention is that the current wheel turning operation counters the current vehicle steering trend, an adjustment scheme of increasing the front axle torque distribution ratio and reducing the rear axle torque distribution ratio is made. In the method, the corresponding torque distribution ratio is determined only based on whether the current steering intention of the driver is to intensify or counter the current vehicle steering trend. As a result, a good drift effect and drift safety often cannot be achieved.

SUMMARY

An objective of the present disclosure is to provide a vehicle drift control method and system, and a vehicle. State parameters of a vehicle are obtained, and a front axle torque ratio of the vehicle is determined based on a first vehicle speed, a first yaw rate, and a first mass center sideslip angle, to cause obtained front axle torque distribution results to be more diversified, such that torque distribution of a front axle and a rear axle can be more appropriate, thereby increasing drift duration and improving drift safety.

According to a first aspect of an embodiment of the present disclosure, a vehicle drift control method is provided as follows. A required whole vehicle torque and state parameters of a vehicle are obtained in response to a drift operation instruction of a user, the state parameters including a first vehicle speed, a first yaw rate, and a first mass center sideslip angle. A front axle torque ratio is determined based on the state parameters. A required front axle torque and a required rear axle torque are determined based on the front axle torque ratio and the required whole vehicle torque. Torques of a front axle motor and a rear axle motor are controlled based on the required front axle torque and the required rear axle torque respectively. According to a second aspect of an embodiment of the present disclosure, a vehicle drift control system is provided, including: a whole vehicle controller and a torque management system connected to the whole vehicle controller.

The whole vehicle controller is configured to obtain required whole vehicle torque and state parameters of a vehicle in response to a drift operation instruction of a user, the state parameters including a first vehicle speed, a first yaw rate, and a first mass center sideslip angle. The torque management system is configured to determine a front axle torque ratio based on the state parameters; determine a required front axle torque and a required rear axle torque based on the front axle torque ratio and the required whole vehicle torque; and control torques of a front axle motor and a rear axle motor based on the required front axle torque and the required rear axle torque respectively.

According to a third aspect of an embodiment of the present disclosure, a vehicle is provided, including the vehicle drift control system according to the second aspect of the present disclosure.

Through the above technical solutions, the required whole vehicle torque and the state parameters of the vehicle are obtained in response to the drift operation instruction of the user, the state parameters including the first vehicle speed, the first yaw rate, and the first mass center sideslip angle, and the front axle torque ratio is determined based on the state parameters. Then the required front axle torque and the required rear axle torque are determined based on the front axle torque ratio and the required whole vehicle torque, and the torques of the front axle motor and the rear axle motor are controlled based on the required front axle torque and the required rear axle torque respectively. By the above method, the required whole vehicle torque of the vehicle and the state parameters of the vehicle can be obtained in real time in an entire process of a driver driving the vehicle to drift. Specifically, different front axle torque ratios can be determined based on different first vehicle speeds, different first yaw rates, and different first mass center sideslip angles. That is, different front axle torque ratios can be obtained under different operating conditions, so that obtained front axle torque ratios are more accurate and diversified, thereby adapting to more operating conditions, causing the torque distribution of the front axle and the rear axle to be more appropriate, increasing the drift duration, and improving the drift safety.

Other features and advantages of the present disclosure are described in detail in the subsequent specific implementations.

BRIEF DESCRIPTION OF THE DRAWINGS

Accompanying drawings are intended to provide a further understanding of the present disclosure. The accompanying drawings, together with the following specific implementations, are intended to explain the present disclosure, but do not constitute a limitation on the present disclosure. In the accompanying drawings.

DETAILED DESCRIPTION

Certain embodiments of the present disclosure are described in detail below with reference to the accompanying drawings. It should be understood that the certain embodiments described herein are merely intended to illustrate and explain the present disclosure, and are not intended to limit the present disclosure.

In the related art, a current steering intention of a driver is determined based on a vehicle state detection signal. If the determined current steering intention is that a current wheel turning operation intensifies a current vehicle steering trend, an adjustment scheme of reducing a front axle torque distribution ratio and increasing a rear axle torque distribution ratio is made, or if the determined current steering intention is that the current wheel turning operation counters the current vehicle steering trend, an adjustment scheme of increasing the front axle torque distribution ratio and reducing the rear axle torque distribution ratio is made. In the method, the corresponding torque distribution ratio is determined only based on whether the current steering intention of the driver is to intensify or counter the current vehicle steering trend, and only two cases of intensification and countering exist, so that only two corresponding torque distribution ratio adjustment schemes exist. As a result, it is impossible to obtain more diversified torque distribution schemes based on different operating conditions, which causes the torque distribution schemes to be not appropriate enough, and a good drift effect and drift safety cannot be achieved.

Accordingly, an embodiment of the present disclosure provides a vehicle drift control method, to obtain a required whole vehicle torque of a vehicle and state parameters of the vehicle in real time in an entire process of a driver driving the vehicle to drift. Specifically, different front axle torque ratios can be determined based on different first vehicle speeds, different first yaw rates, and different first mass center sideslip angles. That is, different front axle torque ratios can be obtained under different operating conditions, so that obtained front axle torque ratios are more accurate and diversified, thereby adapting to more operating conditions, causing torque distribution of a front axle and a rear axle to be more appropriate, increasing drift duration, and improving drift safety.

Figure 1:
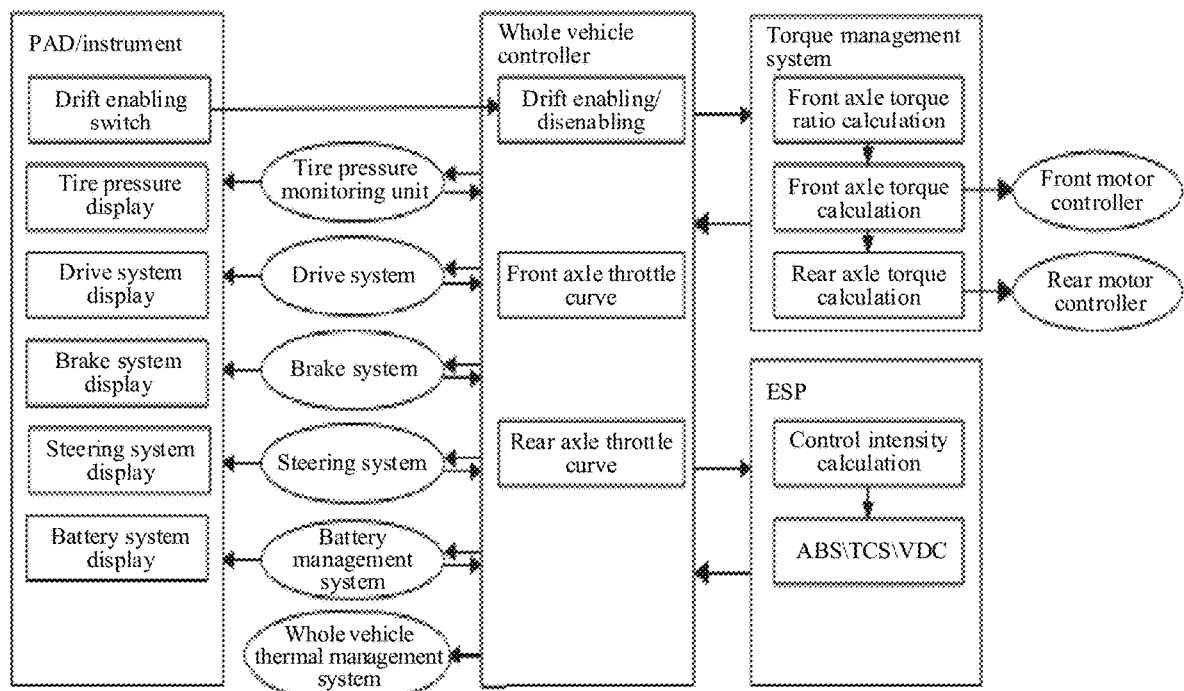
FIG. 1 is a schematic diagram of a vehicle drift control system according to an embodiment of the present disclosure.

FIG. 1 is a schematic diagram of a vehicle drift control system according to an embodiment of the present disclosure. As shown in FIG. 1, the vehicle drift control system according to the embodiment of the present disclosure is first described below. A PAD in FIG. 1 is a vehicle display screen, and an electronic stability program (ESP, electronic stability program), an antilock brake system (ABS), a traction control system (TCS), and a vehicle dynamics control (VDC) system are provided. The vehicle drift control system includes a whole vehicle controller and multiple target control systems connected to the whole vehicle controller. The target control systems may include a tire pressure detection unit, a drive system, a brake system, a steering system, a whole vehicle thermal management system, a battery management system, a front motor controller, a rear motor controller, an electronic stability control system, a switch display system, and a torque management system. A user may trigger a drift operation instruction by a drift enabling switch in the switch display system. After receiving the drift operation instruction, the whole vehicle controller may forward the instruction to the multiple target control systems connected thereto. The multiple target control systems perform self-check in response to the drift operation instruction, and return self-check feedback information to the whole vehicle controller and the corresponding switch display system. The whole vehicle controller may determine whether to enable a drift mode based on the self-check feedback information, and the switch display system may display the self-check feedback information to the user through a corresponding display apparatus.

Figure 2:
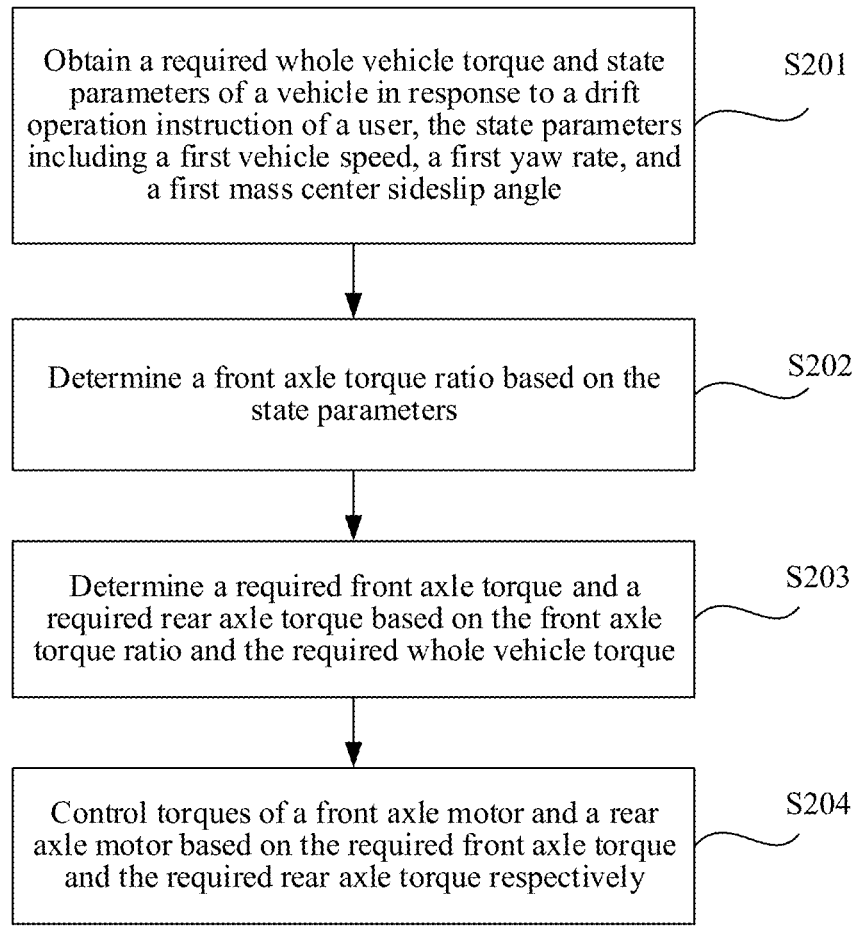
FIG. 2 is a flowchart of a vehicle drift control method according to an embodiment of the present disclosure.

FIG. 2 is a flowchart of a vehicle drift control method according to an embodiment of the present disclosure. The method can be applied to a vehicle drift control system. As shown in FIG. 2, the method includes the following steps.

Step S201, a required whole vehicle torque and state parameters of a vehicle are obtained in response to a drift operation instruction of a user, the state parameters including a first vehicle speed, a first yaw rate, and a first mass center sideslip angle.

In one embodiment, the vehicle drift control system may include a whole vehicle controller, and the drift operation instruction is an instruction to enable a drift mode. There are multiple methods for generating a drift operation instruction. For example, the user may select the drift mode through a physical button, a multimedia switch, a PAD switch, or the like in the switch display system, to generate a drift operation instruction and send the instruction to the whole vehicle controller. A torque management system may obtain the required whole vehicle torque and the state parameters of the vehicle in real time in response to the drift operation instruction of the user. The state parameters of the vehicle may include the first vehicle speed, the first yaw rate, and the first mass center sideslip angle.

A vehicle mass center sideslip angle may be estimated based on a vehicle speed, a yaw rate, a steering wheel angle, and a two-degree-of-freedom linear dynamical model of the vehicle.

Step S202, a front axle torque ratio is determined based on the state parameters.

During an entire drifting driving process, the state parameters may change constantly. The state parameters are obtained in real time, so that different first vehicle speeds, different first yaw rates and different first mass center sideslip angles can be obtained, and therefore different front axle torque ratios can be determined. That is, different front axle torque ratios can be obtained under different operating conditions.

Step S203, a required front axle torque and a required rear axle torque are determined based on the front axle torque ratio and the required whole vehicle torque.

The required whole vehicle torque may be determined based on a brake pedal depth of the current vehicle. Specifically, an original required front axle torque and an original required rear axle torque before distribution may be calculated based on the brake pedal depth and a current front axle throttle curve and rear axle throttle curve, and the required whole vehicle torque may be obtained based on the original required front axle torque and the original required rear axle torque before distribution.

Then, the required front axle torque may be obtained based on the required whole vehicle torque and the front axle torque ratio, and the required rear axle torque may be obtained based on a difference between the required whole vehicle torque and the required front axle torque.

Step S204, torques of a front axle motor and a rear axle motor are controlled based on the required front axle torque and the required rear axle torque respectively.

In one embodiment, the torque management system may send the required front axle torque to a front axle motor controller, so that the front axle motor controller can control the torque of the front axle motor to reach the required front axle torque; and the torque management system may send the required rear axle torque to a rear axle motor controller, so that the rear axle motor controller can control the torque of the rear axle motor to reach the required rear axle torque, to continuously adjust the torque of the front axle motor and the torque of the rear axle motor during the drift of the user, so as to increase drift duration and improve drift safety.

In one embodiment, the required whole vehicle torque of the vehicle and the state parameters of the vehicle can be obtained in real time in an entire process of the driver driving the vehicle to drift. Specifically, different front axle torque ratios can be determined based on different first vehicle speeds, different first yaw rates, and different first mass center sideslip angles. That is, different front axle torque ratios can be obtained under different operating conditions, so that obtained front axle torque ratios are more accurate and diversified, thereby adapting to more operating conditions, causing torque distribution of a front axle and a rear axle to be more appropriate, increasing drift duration, and improving drift safety.

In an implementation, after the response to a drift operation instruction of a user, a drift mode further needs to be enabled. A method for enabling the drift mode may be as follows:

A self-check control instruction is generated when the drift operation instruction is received, to control multiple target control systems related to drift mode control to perform self-check and obtain self-check feedback information of each target control system.

The vehicle is controlled to enter the drift mode when the self-check feedback information of each of the target control systems is preset conformity information.

In one embodiment, there are multiple methods for generating a drift operation instruction. For example, the user may select the drift mode through a physical button, a multimedia switch, a PAD switch, or the like in the switch display system, to generate a drift operation instruction and send the instruction to the whole vehicle controller. The whole vehicle controller may generate the self-check control instruction after receiving the drift operation instruction. Then, the self-check control instruction may be sent to multiple target control systems related to drift mode control and connected to the whole vehicle controller. The target control systems may include a tire pressure detection unit, a drive system, a brake system, a steering system, a whole vehicle thermal management system, a battery management system, a front motor controller, a rear motor controller, an electronic stability control system, and a torque management system. The target control systems perform self-check in response to the self-check control instruction, and return self-check feedback information to the whole vehicle controller and the corresponding switch display system. The whole vehicle controller may determine whether to enable a drift mode based on the self-check feedback information, and the switch display system may display the self-check feedback information to the user through a corresponding display apparatus.

The self-check feedback information may include a detection result of each target control system, and the self-check feedback information of each target control system may include normal and abnormal information, and may be displayed through a corresponding display apparatus. For example, the self-check feedback information of the tire pressure monitoring unit may be displayed through a tire pressure display apparatus; the self-check feedback information of the drive system may be displayed through a drive system display apparatus; the self-check feedback information of the brake system may be displayed through a brake system display apparatus; the self-check feedback information of the steering system may be displayed through a steering system display apparatus; and the self-check feedback information of the battery management system may be displayed through a battery system display apparatus. The self-check feedback information is displayed to the user through the corresponding display apparatuses, so that when there is an abnormal system among the target control systems, the specific abnormal system may be clearly displayed to the user, thereby reminding the user to perform maintenance purposefully. When each piece of the self-check feedback information is normal, it is determined that the self-check feedback information is preset conformity information.

The vehicle may be controlled to enter a drift mode when the self-check feedback information of each of the target control systems is preset conformity information.

In one embodiment, when the drift operation instruction of the user is received, each target control system of the vehicle is detected first. When the self-check feedback information of each of the target control systems is preset conformity information, the drift mode may be enabled, so as to improve the drift safety.

Figure 3:
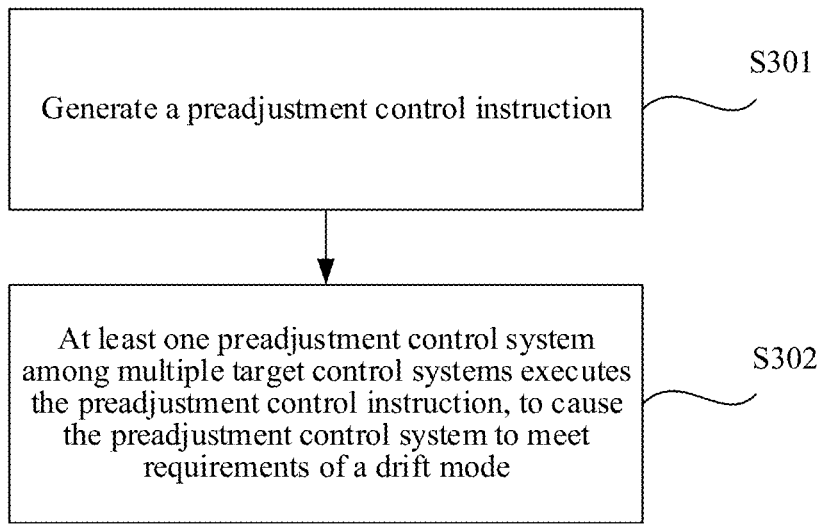
FIG. 3 is a flowchart of a method for adjusting a target control system according to an embodiment of the present disclosure.

FIG. 3 is a flowchart of a method for adjusting a target control system according to an embodiment of the present disclosure. As shown in FIG. 3, in a feasible implementation, after the drift mode is enabled, and before the user performs a drift operation, that is, in a drift preparation stage, the whole vehicle controller and the target control systems may be further adjusted, so that each target control system can be more adaptable to the drift mode to achieve a better drift effect. For example, the method may include the following steps:

Step S301, a pre-adjustment control instruction is generated.

In this implementation, when the self-check feedback information of each of the target control systems is preset conformity information, the whole vehicle controller may generate the pre-adjustment control instruction.

Step S302, at least one pre-adjustment control system among the multiple target control systems executes the pre-adjustment control instruction, to cause the pre-adjustment control system to meet requirements of the drift mode.

The at least one pre-adjustment control system among the target control systems may execute the pre-adjustment control instruction. Specifically, each pre-adjustment control system may be correspondingly adjusted based on an adjustment policy of the pre-adjustment control system. For example, parameters of some of the pre-adjustment control systems may be adjusted to the best, while another part of the pre-adjustment control system may remain in an original state. For example, the drive system, the brake system, the steering system, the vehicle torque management system, the electronic stability control system, and the like remain in an original state if there is no abnormality. Therefore, the pre-adjustment control systems meet the requirements of the drift mode. The requirements herein include performance requirements and power requirements, where the performance requirements may include stability of the vehicle, and the power requirements may include power performance of the vehicle.

In a possible implementation, the pre-adjustment control system includes a whole vehicle thermal management system; and that at least one pre-adjustment control system among the multiple target control systems executes the pre-adjustment control instruction may include the following method:

A temperature of each subsystem of the whole vehicle thermal management system is controlled within a corresponding preset drift temperature range.

In one embodiment, the whole vehicle thermal management system includes multiple subsystems, and the multiple subsystems may include an air conditioning system, an oil pump system, a cooling system, and the like. Each subsystem has a corresponding preset drift temperature range, and the preset drift temperature range is a preset temperature range for adapting to the drift mode, so as to improve the drift performance of the vehicle.

In a possible implementation, the pre-adjustment control system includes a battery management system; and that at least one pre-adjustment control system among the multiple target control systems executes the pre-adjustment control instruction may include the following step.

The battery management system is controlled to adjust discharge power of a battery to target discharge power.

In one embodiment, the battery management system is controlled to adjust the discharge power of the battery to the target discharge power, so as to improve the current discharge power of the vehicle, provide a better power output or braking capability, and improve the drift performance of the vehicle.

For example, the battery management system may be controlled to adjust the temperature of the battery module to a first preset temperature range, which is a temperature range of the battery module with maximum power release efficiency, calculate a required time, inform the user in the form of instrument display or voice broadcast to provide sufficient preparation time for the user, and obtain current discharge power, and the battery management system is controlled to adjust the current discharge power to target discharge power. The current discharge power is preset conventional discharge power corresponding to an actual SOC, and the target discharge power is greater than the current discharge power. The discharge power is appropriately increased to meet requirements of the driver for greater power.

Since different battery modules correspond to different optimal power release temperature ranges, the first preset temperature range with the maximum power release efficiency corresponding to the current battery module is obtained, and the temperature of the battery module is adjusted to the first preset temperature range, so that the discharge power of the current battery module can be improved to the target discharge power, to provide a better power output or braking capability, so as to improve the drifting performance of the vehicle.

In an implementation, the pre-adjustment control system further includes a front motor controller and a rear motor controller; and that at least one pre-adjustment control system among the multiple target control systems executes the pre-adjustment control instruction includes:

The front motor controller is controlled to adjust a temperature of the front axle motor to a second preset temperature range, and a current motor torque loading/unloading rate of the front motor controller is adjusted to a target loading/unloading rate.

The rear motor controller is controlled to adjust a temperature of the rear axle motor to the second preset temperature range, and a current motor torque loading/unloading rate of the rear motor controller is adjusted to a target loading/unloading rate, the current motor torque loading/unloading rate being a preset conventional loading/unloading rate, and the target loading/unloading rate being greater than the current motor torque loading/unloading rate.

In one embodiment, the second preset temperature range is a preset optimal operating temperature range of a motor. By controlling the front motor controller to adjust the temperature of the front axle motor to the second preset temperature range and controlling the rear motor controller to adjust the temperature of the rear axle motor to the second preset temperature range, an output can be ensured, so as to improve the drift performance. The current motor torque loading/unloading rate of the front motor controller is adjusted to the target loading/unloading rate, and the current motor torque loading/unloading rate of the rear motor controller is adjusted to the target loading/unloading rate, so as to improve a motor torque response rate and ensure a fastest torque output response.

In a possible implementation, the pre-adjustment control system includes a throttle torque control system; and that at least one pre-adjustment control system among the multiple target control systems executes the pre-adjustment control instruction includes:

The throttle torque control system switches a current throttle response curve to a preset power performance response curve.

In this implementation, to enable the vehicle to drift better and achieve a better drift effect, the throttle response curve may be adjusted to a preset power performance response curve. The throttle response curve may include a preset economy curve and a preset power performance curve. At the same throttle opening, a required torque corresponding to the preset power performance curve is greater than a required torque corresponding to the preset economy curve, to provide better power performance.

In a feasible implementation, after that the vehicle is controlled to enter a drift mode, the method further includes:

The vehicle is controlled to enter a rear drive control mode, the rear drive control mode preferentially distributing the required whole vehicle torque to the rear axle motor.

The vehicle is controlled to enter a four-wheel drive control mode when it is obtained that a vehicle speed reaches a preset vehicle speed threshold, the four-wheel drive control mode being that the torques of the front axle motor and the rear axle motor are controlled based on the required front axle torque and the required rear axle torque respectively.

In this implementation, to improve acceleration performance of the vehicle, enable better drifting, and achieve a better drift effect, after the drift mode is enabled, the vehicle may be first controlled to enter a rear drive control mode. In the rear drive control mode, the required whole vehicle torque is preferentially provided by the rear axle motor. When the rear axle motor cannot provide a sufficient required whole vehicle torque, an insufficient torque is supplemented by the front axle motor.

The vehicle may be controlled to enter the four-wheel drive control mode when it is obtained that the vehicle speed reaches the preset vehicle speed threshold, so that the required front axle torque and the required rear axle torque are obtained based on the obtained front axle torque ratio, so as to control the torques of the front axle motor and the rear axle motor based on the required front axle torque and the required rear axle torque respectively. Therefore, the stability of the vehicle is ensured, the drift time is prolonged, and the safety of the vehicle is improved.

The preset vehicle speed threshold is a speed at which the vehicle can drift. Different road surfaces correspond to different preset vehicle speed thresholds. The preset vehicle speed threshold may be calibrated by a manufacturer based on a test or set by the user based on an actual situation, so as to determine the preset vehicle speed threshold based on a current road surface.

In a feasible implementation, at the same time as the drift preparation stage, the control of the drift stage may be also executed based on a drift operation of the user. That a front axle torque ratio is determined based on the state parameters may include the following steps:

An original front axle torque ratio is determined based on the first vehicle speed.

A first front axle torque ratio correction coefficient is determined based on the first yaw rate.

A second front axle torque ratio correction coefficient is determined based on the first mass center sideslip angle.

The front axle torque ratio is determined based on the original front axle torque ratio, the first front axle torque ratio correction coefficient, and the second front axle torque ratio correction coefficient.

Figure 4:
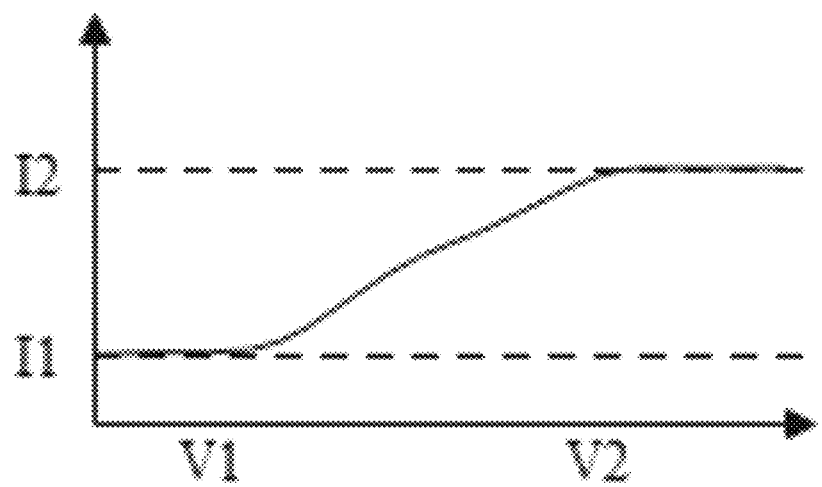
FIG. 4 is a schematic diagram showing an association relationship between a first vehicle speed and an original front axle torque ratio according to an embodiment of the present disclosure.

In one embodiment, the original front axle torque ratio may be determined based on an association relationship between the first vehicle speed and the original front axle torque ratio. For example, FIG. 4 is a schematic diagram showing an association relationship between a first vehicle speed and an original front axle torque ratio according to an embodiment of the present disclosure. As shown in FIG. 4, original front axle torque ratio thresholds I1 and I2 (I1<I2) and first vehicle speed thresholds V1 and V2 are preset. For example, I1 may range from 5% to 15%, I2 may range from 30% to 35%, V1 may range from 20 km/h to 50 km/h, and V2 may range from 100 km/h to 120 km/h. The original front axle torque ratio is not less than the threshold I1, but is not greater than the threshold I2. When the first vehicle speed is less than V1, the original front axle torque ratio is I1. When the first vehicle speed is greater than V2, the original front axle torque ratio is I2. When the first vehicle speed is between V1 and V2, the first vehicle speed is positively correlated with the original front axle torque ratio. The original front axle torque ratio is obtained by looking up a table.

Figure 5:
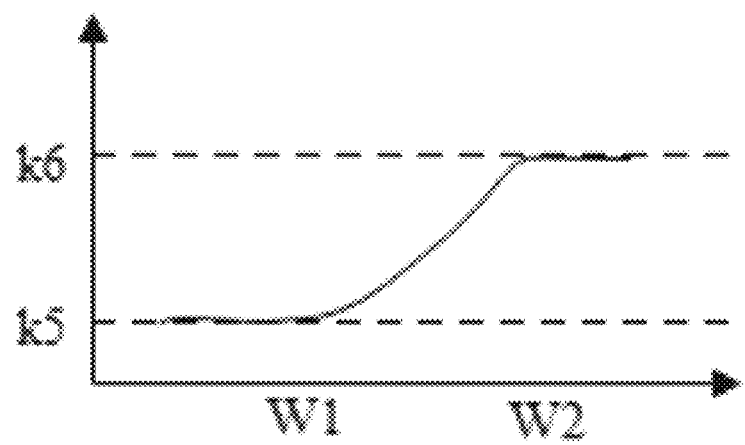
FIG. 5 is a schematic diagram showing an association relationship between a first yaw rate and a first front axle torque ratio correction coefficient according to an embodiment of the present disclosure.

The first front axle torque ratio correction coefficient may be determined based on an association relationship between the first yaw rate and the first front axle torque ratio correction coefficient. For example, FIG. 5 is a schematic diagram showing an association relationship between a first yaw rate and a first front axle torque ratio correction coefficient according to an embodiment of the present disclosure. As shown in FIG. 5, first front axle torque ratio correction coefficient thresholds k5 and k6 (k5<k6) and first front axle torques W1 and W2 are preset. K5 may be 1, and k6 may range from 1.5 to 1.8. W1 may range from 25 deg/s to 35 deg/s, and W2 may range from 50 deg/s to 60 deg/s. The first front axle torque ratio correction coefficient is not less than the threshold k5, but is not greater than the threshold k6. When the first yaw rate is less than W1, the first front axle torque ratio correction coefficient is k5. When the first yaw rate is greater than W2, the first front axle torque ratio correction coefficient is k6. When the first yaw rate is between W1 and W2, the first yaw rate is positively correlated with the first front axle torque ratio correction coefficient. The first front axle torque ratio correction coefficient is obtained by looking up a table.

Figure 6:
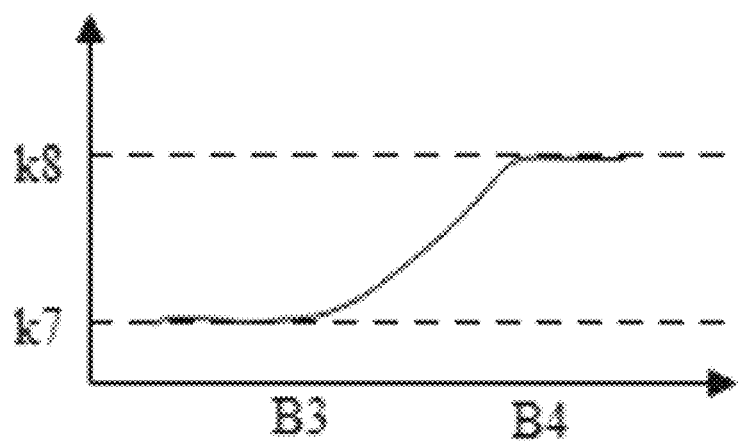
FIG. 6 is a schematic diagram showing an association relationship between a first mass center sideslip angle and a second front axle torque ratio correction coefficient according to an embodiment of the present disclosure.

The second front axle torque ratio correction coefficient may be determined based on an association relationship between the first mass center sideslip angle and the second front axle torque ratio correction coefficient. For example, FIG. 6 is a schematic diagram showing an association relationship between a first mass center sideslip angle and a second front axle torque ratio correction coefficient according to an embodiment of the present disclosure. As shown in FIG. 6, second front axle torque ratio correction coefficient thresholds k7 and k8 (k7<k8) and first mass center sideslip angle B3 and B4 are preset. k7 may be 1, and k8 may range from 1.5 to 1.8. B3 may range from 1° to 1.5°, and B4 may range from 4° to 6°. The second front axle torque ratio correction coefficient is not less than the threshold k7, but is not greater than the threshold k8. When the first mass center sideslip angle is less than B3, the second front axle torque ratio correction coefficient is k7. When the first mass center sideslip angle is greater than B4, the second front axle torque ratio correction coefficient is k8. When the first mass center sideslip angle is between B3 and B4, the first mass center sideslip angle is positively correlated with the second front axle torque ratio correction coefficient. The second front axle torque ratio correction coefficient is obtained by looking up a table.

After the original front axle torque ratio, the first front axle torque ratio correction coefficient and the second front axle torque ratio correction coefficient are obtained, the front axle torque ratio may be determined based on the original front axle torque ratio, the first front axle torque ratio correction coefficient and the second front axle torque ratio correction coefficient. For example, a product of the original front axle torque ratio, the first front axle torque ratio correction coefficient and the second front axle torque ratio correction coefficient may be determined as the front axle torque ratio.

In one embodiment, the first yaw rate and the first mass center sideslip angle both represent the stability of the vehicle. The original front axle torque ratio is determined by the first vehicle speed, and is combined with the first front axle torque ratio correction coefficient and the second front axle torque ratio correction coefficient that are determined by the first yaw rate and the first mass center sideslip angle that represent the stability of the vehicle, to determine the front axle torque ratio, which can improve drift stability of the vehicle.

In a feasible implementation, the state parameters may further include at least one of a first accelerator pedal depth and a first brake pedal depth.

Figure 7:
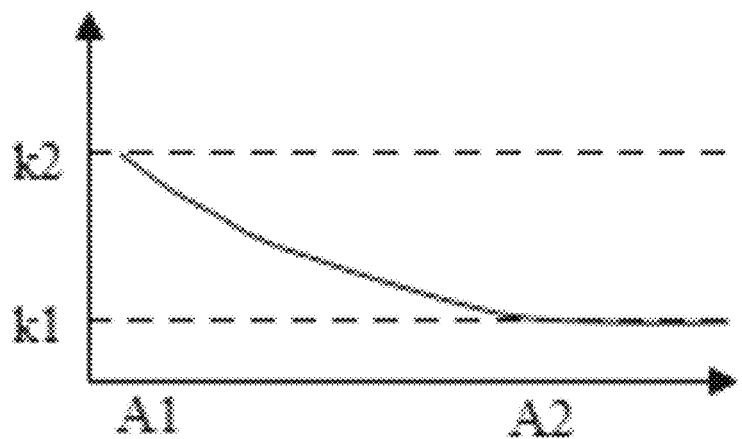
FIG. 7 is a schematic diagram showing an association relationship between a first accelerator pedal depth and a third front axle torque ratio correction coefficient according to an embodiment of the present disclosure.

A third front axle torque ratio correction coefficient may be determined based on an association relationship between the first accelerator pedal depth and the third front axle torque ratio correction coefficient. For example, FIG. 7 is a schematic diagram showing an association relationship between a first accelerator pedal depth and a third front axle torque ratio correction coefficient according to an embodiment of the present disclosure. As shown in FIG. 7, third front axle torque ratio correction coefficient thresholds k1 and k2 (k1<k2) and first accelerator pedal depths A1 and A2 are preset. k1 may range from 0.6 to 0.8, and k2 may be 1. A1 may range from 40% to 50%, and A2 may be 100%. The third front axle torque ratio correction coefficient is not less than the threshold k1, but is not greater than the threshold k2. When the first accelerator pedal depth is less than A1, the third front axle torque ratio correction coefficient is k2. When the first accelerator pedal depth is greater than A2, the third front axle torque ratio correction coefficient is k2. When the first accelerator pedal depth is between A1 and A2, the first accelerator pedal depth is negatively correlated with the third front axle torque ratio correction coefficient. The third front axle torque ratio correction coefficient is obtained by looking up a table.

Figure 8:
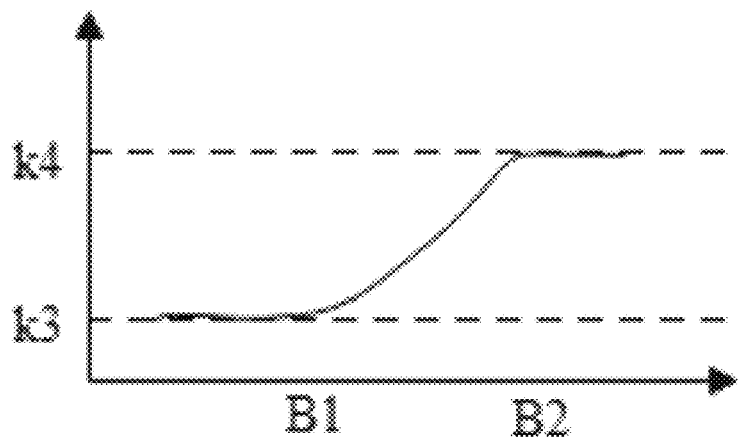
FIG. 8 is a schematic diagram showing an association relationship between a first brake pedal depth and a front axle torque ratio correction value according to an embodiment of the present disclosure.

A front axle torque ratio correction value may be determined based on an association relationship between the first brake pedal depth and the front axle torque ratio correction value. For example, FIG. 8 is a schematic diagram showing an association relationship between a first brake pedal depth and a front axle torque ratio correction value according to an embodiment of the present disclosure. As shown in FIG. 8, front axle torque ratio correction values k3 and k4 (k3<k4) and first brake pedal depths B1 and B2 are preset. k3 may be 0, and k4 may be 1. B1 may be 10% to 20%, and B2 may be 100%. The front axle torque ratio correction value is not less than the threshold k3, but is not greater than the threshold k4. When the first brake pedal depth is less than B1, the front axle torque ratio correction value is k3. When the first brake pedal depth is greater than B2, the front axle torque ratio correction value is k4. When the first brake pedal depth is between B1 and B2, the first brake pedal depth is positively correlated with the front axle torque ratio correction value. The front axle torque ratio correction value is obtained by looking up a table.

The front axle torque ratio may be determined based on the original front axle torque ratio, the first front axle torque ratio correction coefficient, the second front axle torque ratio correction coefficient, and at least one of the third front axle torque ratio correction coefficient and the front axle torque ratio correction value.

For example, a product of the original front axle torque ratio, the first front axle torque ratio correction coefficient, the second front axle torque ratio correction coefficient and the third front axle torque ratio correction coefficient may be determined as the front axle torque ratio.

Alternatively, the front axle torque ratio may be obtained by subtracting the front axle torque ratio correction value from a product of the original front axle torque ratio, the first front axle torque ratio correction coefficient and the second front axle torque ratio correction coefficient.

Alternatively, the front axle torque ratio may be obtained by subtracting the front axle torque ratio correction value from a product of the original front axle torque ratio, the first front axle torque ratio correction coefficient, the second front axle torque ratio correction coefficient and the third front axle torque ratio correction coefficient.

In one embodiment, in the process of determining the front axle torque ratio, depths of an accelerator pedal and a brake pedal are considered, which can cause the obtained front axle torque ratio to be more accurate, thereby improving the stability of the vehicle and the drift performance of the vehicle.

In a feasible implementation, state parameters may be detected in real time, and then a control intensity of the electronic stability control system may be determined, so as to determine the difficulty of the electronic stability control system entering the vehicle stability control, and improve the drift effect and ensure the safety of the vehicle.

In a feasible implementation, the state parameters may include a second yaw rate and a second mass center sideslip angle.

Figure 9:
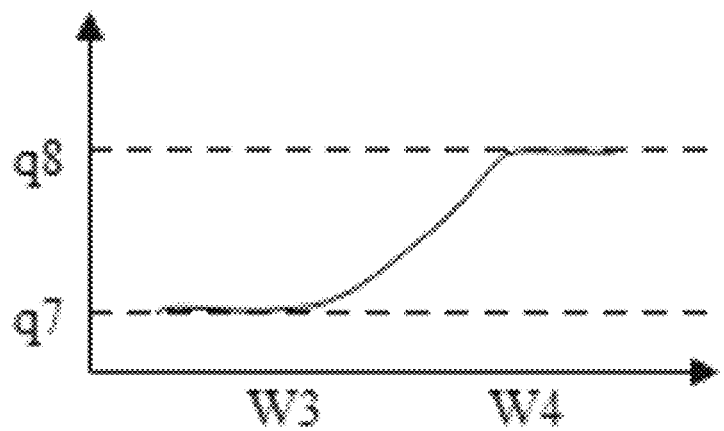
FIG. 9 is a schematic diagram showing an association relationship between a second yaw rate and a first control intensity coefficient according to an embodiment of the present disclosure.

A first control intensity coefficient may be determined based on an association relationship between the second yaw rate and the first control intensity coefficient. For example, FIG. 9 is a schematic diagram showing an association relationship between a second yaw rate and a first control intensity coefficient according to an embodiment of the present disclosure. As shown in FIG. 9, thresholds q7 and q8 are preset. When the second yaw rate is less than W3, the first control intensity coefficient is q7. When the second yaw rate is greater than W4, the first control intensity coefficient is q8. When the second yaw rate is between W3 and W4, the second yaw rate is positively correlated with the first control intensity coefficient, which is obtained by looking up a table. q7 may range from 1 to 1.5, and q8 may range from 9 to 10. W3 may range from 25 deg/s to 35 deg/s, and W4 may range from 50 deg/s to 60 deg/s.

Figure 10:
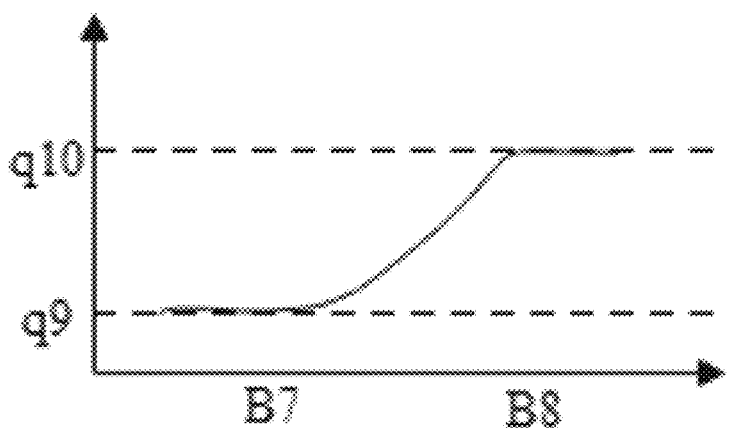
FIG. 10 is a schematic diagram showing an association relationship between a second mass center sideslip angle and a second control intensity coefficient according to an embodiment of the present disclosure.

A second control intensity coefficient may be determined based on an association relationship between the second mass center sideslip angle and the second control intensity coefficient. For example, FIG. 10 is a schematic diagram showing an association relationship between a second mass center sideslip angle and a second control intensity coefficient according to an embodiment of the present disclosure. As shown in FIG. 10, thresholds q9 and q10 are preset. When the second mass center sideslip angle is less than B7, the second control intensity coefficient is q9. When the second mass center sideslip angle is greater than B8, the second control intensity coefficient is q10. When the second yaw rate is between W3 and W4, the second mass center sideslip angle is positively correlated with the second control intensity coefficient, which is obtained by looking up a table. q9 may range from 1 to 1.5, and q10 may range from 9 to 10. B7 may range from 10 to 1.5°, and B8 may range from 4° to 6°.

After the first control intensity coefficient and the second control intensity coefficient are obtained, a product of the first control intensity coefficient and the second control intensity coefficient may be determined as a control intensity.

Herein, the electronic stability control system completely exits the vehicle stability control, which means that the control intensity drops to 0. Subsequently, the control intensity may be adjusted in real time based on a vehicle state. For example, 0 denotes complete exit, 10 denotes normal control, and 20 denotes strongest control, spaced apart by 1 therebetween. The electronic stability control system may adjust an intervention level based on the control intensity. A smaller control intensity indicates a lower intervention level, and a lower intervention level indicates a more obvious degradation response. That is, a lower intervention level indicates a higher difficulty of the electronic stability control system entering vehicle stability control.

In one embodiment, the second yaw rate and the second mass center sideslip angle represent the stability of the vehicle, and the control intensity of the electronic stability control system entering the vehicle stability control is determined by the second yaw rate and the second mass center sideslip angle, which can improve the drift effect and ensure the safety of the vehicle. For example, when the vehicle stability is good, the control intensity is low. In this case, the electronic stability control system does not enter the vehicle stability control, so as not to affect a drift operation of the user. When the vehicle stability is low, the electronic stability control system enters the vehicle stability control to ensure the stability of the vehicle and improve the safety of the vehicle.

In a feasible implementation, the state parameters further include at least one of a second vehicle speed, a second accelerator pedal depth, and a second brake pedal depth.

Figure 11:
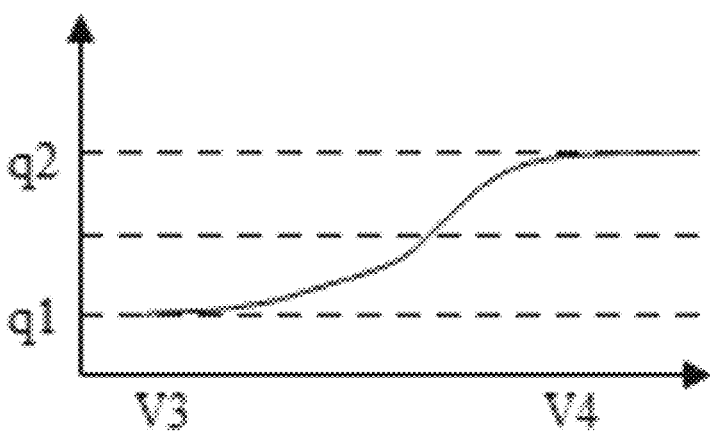
FIG. 11 is a schematic diagram showing an association relationship between a second vehicle speed and a third control intensity coefficient according to an embodiment of the present disclosure.

A third control intensity coefficient may be determined based on an association relationship between the second vehicle speed and the third control intensity coefficient. For example, FIG. 11 is a schematic diagram showing an association relationship between a second vehicle speed and a third control intensity coefficient according to an embodiment of the present disclosure. As shown in FIG. 11, thresholds q1 and q2 are preset. When the second vehicle speed is less than V3, the third control intensity coefficient is q1. When the second vehicle speed is greater than V4, the third control intensity coefficient is q2. When the second vehicle speed is between V3 and V4, the second vehicle speed is positively correlated with the third control intensity coefficient, which is obtained by looking up a table. q1 may be 1, and q2 may range from 18 to 20. V3 may range from 90 km/h to 100 km/h, and V4 may range from 150 km/h to 160 km/h.

Figure 12:
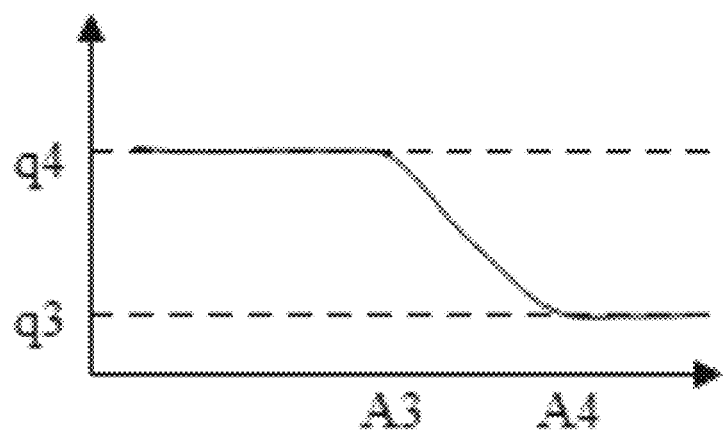
FIG. 12 is a schematic diagram showing an association relationship between a second accelerator pedal depth and a fourth control intensity coefficient according to an embodiment of the present disclosure.

A fourth control intensity coefficient may be determined based on an association relationship between the second accelerator pedal depth and the fourth control intensity coefficient. For example, FIG. 12 is a schematic diagram showing an association relationship between a second accelerator pedal depth and a fourth control intensity coefficient according to an embodiment of the present disclosure. As shown in FIG. 12, thresholds q3 and q4 are preset. When the second accelerator pedal depth is less than A3, the fourth control intensity coefficient is q4. When the second accelerator pedal depth is greater than A4, the fourth control intensity coefficient is q3. When the second accelerator pedal depth is between A3 and A4, the second accelerator pedal depth is negatively correlated with the fourth control intensity coefficient, which is obtained by looking up a table. q3 may range from 0.5 to 0.6, and q4 may be 1. A3 may range from 40% to 50%, and A4 may be 100%.

Figure 13:
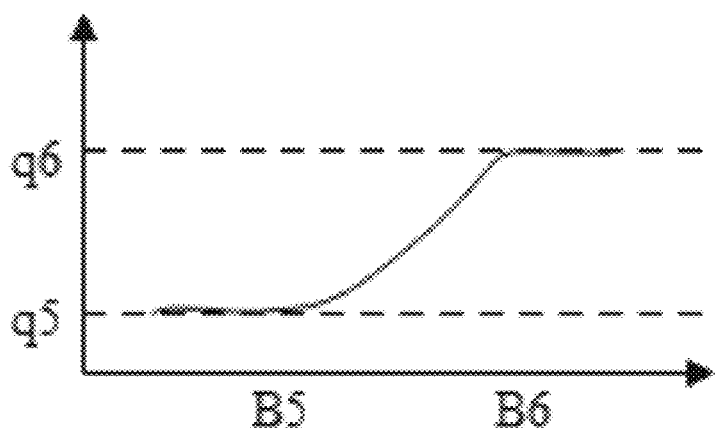
FIG. 13 is a schematic diagram showing an association relationship between a second brake pedal depth and a fifth control intensity coefficient according to an embodiment of the present disclosure.

A fifth control intensity coefficient may be determined based on an association relationship between the second brake pedal depth and the fifth control intensity coefficient. For example, FIG. 13 is a schematic diagram showing an association relationship between a second brake pedal depth and a fifth control intensity coefficient according to an embodiment of the present disclosure. As shown in FIG. 13, thresholds q5 and q6 are preset. When the second brake pedal depth is less than B5, the fifth control intensity coefficient is q5. When the second brake pedal depth is greater than B6, the fifth control intensity coefficient is q6. When the second brake pedal depth is between B5 and B6, the second brake pedal depth is positively correlated with the fifth control intensity coefficient, which is obtained by looking up a table. q5 may range from 1 to 1.5, and q6 may range from 9 to 10. B5 may range from 10% to 20%, and B6 may be 100%.

The control intensity may be determined based on the first control intensity coefficient, the second control intensity coefficient, and at least one of the third control intensity coefficient, the fourth control intensity coefficient and the fifth control intensity coefficient.

For example, a product of the first control intensity coefficient, the second control intensity coefficient and the third control intensity coefficient may be determined as a control intensity.

A product of the first control intensity coefficient, the second control intensity coefficient and the fourth control intensity coefficient may be determined as a control intensity.

A value obtained by subtracting the fifth control intensity coefficient from a product of the first control intensity coefficient and the second control intensity coefficient may be determined as a control intensity.

A value obtained by subtracting the fifth control intensity coefficient from a product of the first control intensity coefficient, the second control intensity coefficient and the third control intensity coefficient may be determined as a control intensity.

A value obtained by subtracting the fifth control intensity coefficient from a product of the first control intensity coefficient, the second control intensity coefficient and the fourth control intensity coefficient may be determined as a control intensity.

A value obtained by subtracting the fifth control intensity coefficient from a product of the first control intensity coefficient, the second control intensity coefficient, the third control intensity coefficient and the fourth control intensity coefficient may be determined as a control intensity.

In one embodiment, the second vehicle speed, the second accelerator pedal depth, the second brake pedal depth, and the like are considered in the calculation of the control intensity, which can improve accuracy of the control intensity, so as to ensure the safety of the vehicle while improving the drift of the vehicle.

In a feasible implementation, a method of exiting the drift mode may be as follows:

When a drift exit instruction is received, the drift mode is exited, and the torques of the front axle motor and the rear axle motor are controlled to be reduced by a torque management system and the electronic stability control system until the electronic stability control system monitors that the vehicle is in a stable state.

In this implementation, when the user chooses to disenable the drift mode or step on the brake pedal by a larger depth (when the brake pedal depth is greater than a preset brake pedal depth) or when the vehicle is severely unstable (when the control intensity is greater than a preset control intensity threshold), the drift exit instruction may be generated, and the whole vehicle controller controls the vehicle to exit the drift mode. In response to the drift exit instruction, the torque management system may control the whole vehicle torque to be quickly reduced, and the electronic stability control system may quickly perform vehicle stability control until the electronic stability control system determines that the vehicle is in a stable state, so that the vehicle can safely exit the drift mode.

For the vehicle drift control system, optionally, the torque management system is configured to determine an original front axle torque ratio based on the first vehicle speed;
  determine a first front axle torque ratio correction coefficient based on the first yaw rate;
  determine a second front axle torque ratio correction coefficient based on the first mass center sideslip angle; and
  determine the front axle torque ratio based on the original front axle torque ratio, the first front axle torque ratio correction coefficient, and the second front axle torque ratio correction coefficient.

Optionally, the state parameters further include at least one of a first accelerator pedal depth and a first brake pedal depth; and
  the torque management system is further configured to
  determine a third front axle torque ratio correction coefficient based on the first accelerator pedal depth; and/or determine a front axle torque ratio correction value based on the first brake pedal depth; and
  determine the front axle torque ratio based on the original front axle torque ratio, the first front axle torque ratio correction coefficient, the second front axle torque ratio correction coefficient, and at least one of the third front axle torque ratio correction coefficient and the front axle torque ratio correction value.

Optionally, the vehicle drift control system further includes an electronic stability control system; and
  the electronic stability control system is configured to determine a control intensity based on the state parameters, the control intensity being negatively related to a difficulty of an electronic stability control system entering vehicle stability control, and the state parameters including a second yaw rate and a second mass center sideslip angle.

Optionally, the electronic stability control system is configured to
  determine a first control intensity coefficient based on the second yaw rate;
  determine a second control intensity coefficient based on the second mass center sideslip angle; and
  determine the control intensity based on the first control intensity coefficient and the second control intensity coefficient.

Optionally, the state parameters further include at least one of a second vehicle speed, a second accelerator pedal depth, and a second brake pedal depth; and
  the electronic stability control system is further configured to
  determine a third control intensity coefficient based on the second vehicle speed; and/or determine a fourth control intensity coefficient based on the second accelerator pedal depth; and/or determine a fifth control intensity coefficient based on the second brake pedal depth; and
  determine the control intensity based on the first control intensity coefficient, the second control intensity coefficient, and at least one of the third control intensity coefficient, the fourth control intensity coefficient and the fifth control intensity coefficient.

Optionally, the vehicle drift control system further includes multiple target control systems, and after the response to a drift operation instruction of a user, the whole vehicle controller is further configured to
  generate a self-check control instruction when the drift operation instruction is received, to control multiple target control systems related to drift mode control to perform self-check and obtain self-check feedback information of each target control system; and
  control the vehicle to enter a drift mode when the self-check feedback information of each of the target control systems is preset conformity information.

Optionally, the target control system includes a pre-adjustment control system;
  when the self-check feedback information of each of the target control systems is preset conformity information, the whole vehicle controller is further configured to generate a pre-adjustment control instruction; and
  the pre-adjustment control system is configured to execute the pre-adjustment control instruction, to cause the pre-adjustment control system to meet requirements of the drift mode.

Optionally, the pre-adjustment control system includes a whole vehicle thermal management system; and
  the whole vehicle thermal management system is configured to control a temperature of each subsystem within a corresponding preset drift temperature range.

Optionally, the pre-adjustment control system further includes a battery management system; and
  the battery management system is configured to
  adjust discharge power of a battery to target discharge power.

Optionally, the battery management system is configured to
  control the battery management system to adjust a temperature of a battery module to a first preset temperature range, the first preset temperature range being a temperature range of the battery module with maximum power release efficiency; and
  obtain current discharge power, and control the battery management system to adjust the current discharge power to target discharge power, where the current discharge power is preset conventional discharge power corresponding to an actual SOC, and the target discharge power is greater than the current discharge power.

Optionally, the pre-adjustment control system further includes a front motor controller and a rear motor controller;
  the front motor controller is configured to adjust a temperature of the front axle motor to a second preset temperature range, and adjust a current motor torque loading/unloading rate to a target loading/unloading rate; and
  the front motor controller is configured to adjust a temperature of the rear axle motor to the second preset temperature range, and adjust a current motor torque loading/unloading rate to a target loading/unloading rate, the current motor torque loading/unloading rate being a preset conventional loading/unloading rate, and the target loading/unloading rate being greater than the current motor torque loading/unloading rate.

Optionally, the pre-adjustment control system includes a throttle torque control system; and the throttle torque control system is configured to switch a current throttle response curve to a preset power performance response curve.

Optionally, after that the vehicle is controlled to enter a drift mode, the whole vehicle controller is further configured to control the vehicle to enter a rear drive control mode, the rear drive control mode preferentially distributing the required whole vehicle torque to the rear axle motor; and control the vehicle to enter a four-wheel drive control mode when it is obtained that a vehicle speed reaches a preset vehicle speed threshold, the four-wheel drive control mode being that the torques of the front axle motor and the rear axle motor are controlled based on the required front axle torque and the required rear axle torque respectively.

Optionally, the whole vehicle controller is further configured to exit a drift mode when a drift exit instruction is received;

the torque management system is configured to control the torques of the front axle motor and the rear axle motor to be reduced until the electronic stability control system monitors that the vehicle is in a stable state; and the electronic stability control system is configured to enter stability control of the vehicle until it is monitored that the vehicle is in the stable state.

For the vehicle drift control system, a specific manner of each subsystem performing an operation is already described in detail in the embodiments related to the method, and details are not described herein.

An embodiment of the present disclosure further provides a vehicle, including the vehicle drift control system according to the above embodiment.

The preferred implementations of the present disclosure have been described above in detail with reference to the accompanying drawings, but the present disclosure is not limited to the specific details in the above-mentioned implementations. Within the scope of the technical concept of the present disclosure, various simple modifications may be made to the technical solutions of the present disclosure, and these simple modifications all fall within the protection scope of the present disclosure.

In addition, it should be noted that the specific technical features described in the above-mentioned certain embodiments can be combined in any suitable manner without contradiction. To prevent unnecessary repetition, various possible combinations are no longer explained separately in the present disclosure.

In addition, various implementations of the present disclosure may also be arbitrarily combined, provided that they do not depart from the idea of the present disclosure, which should also be regarded as the contents disclosed in the present disclosure.

What is claimed is:

1. A vehicle drift control method, comprising:
   obtaining a required whole vehicle torque and state parameters of a vehicle in response to a drift operation instruction of a user, the state parameters comprising a first vehicle speed, a first yaw rate, and a first mass center sideslip angle;
   determining a front axle torque ratio based on the state parameters;
   determining a required front axle torque and a required rear axle torque based on the front axle torque ratio and the required whole vehicle torque; and
   controlling torques of a front axle motor and a rear axle motor based on the required front axle torque and the required rear axle torque respectively.

2. The vehicle drift control method according to claim 1, wherein
   the determining the front axle torque ratio based on the state parameters comprises:
   determining an original front axle torque ratio based on the first vehicle speed;
   determining a first front axle torque ratio correction coefficient based on the first yaw rate;
   determining a second front axle torque ratio correction coefficient based on the first mass center sideslip angle; and
   determining the front axle torque ratio based on the original front axle torque ratio, the first front axle torque ratio correction coefficient, and the second front axle torque ratio correction coefficient.

3. The vehicle drift control method according to claim 2, wherein
   the state parameters further comprise at least one of a first accelerator pedal depth and a first brake pedal depth;
   before the determining the front axle torque ratio based on the original front axle torque ratio, the first front axle torque ratio correction coefficient, and the second front axle torque ratio correction coefficient, the method further comprises:
   determining a third front axle torque ratio correction coefficient based on the first accelerator pedal depth; and/or determining a front axle torque ratio correction value based on the first brake pedal depth; and
   the determining the front axle torque ratio based on the original front axle torque ratio, the first front axle torque ratio correction coefficient, and the second front axle torque ratio correction coefficient comprises:
   determining the front axle torque ratio based on the original front axle torque ratio, the first front axle torque ratio correction coefficient, the second front axle torque ratio correction coefficient, and at least one of the third front axle torque ratio correction coefficient and the front axle torque ratio correction value.

4. The vehicle drift control method according to claim 1, further comprising:
   determining a control intensity based on the state parameters, the control intensity being negatively related to a difficulty of an electronic stability control system entering vehicle stability control, and the state parameters comprising a second yaw rate and a second mass center sideslip angle.

5. The vehicle drift control method according to claim 4, wherein
   the determining the control intensity based on the state parameters comprises:
   determining a first control intensity coefficient based on the second yaw rate;
   determining a second control intensity coefficient based on the second mass center sideslip angle; and
   determining the control intensity based on the first control intensity coefficient and the second control intensity coefficient.

6. The vehicle drift control method according to claim 5, wherein the state parameters further comprise at least one of a second vehicle speed, a second accelerator pedal depth, and a second brake pedal depth;

before the determining the control intensity based on the first control intensity coefficient and the second control intensity coefficient, the method further comprises:

determining a third control intensity coefficient based on the second vehicle speed; and/or determining a fourth control intensity coefficient based on the second accelerator pedal depth; and/or determining a fifth control intensity coefficient based on the second brake pedal depth; and the determining the control intensity based on the first control intensity coefficient and the second control intensity coefficient comprises:

determining the control intensity based on the first control intensity coefficient, the second control intensity coefficient, and at least one of the third control intensity coefficient, the fourth control intensity coefficient and the fifth control intensity coefficient.

7. The vehicle drift control method according to claim 1, after the response to the drift operation instruction of the user, the method further comprising:

generating a self-check control instruction when the drift operation instruction is received, to control a plurality of target control systems related to drift mode control to perform self-check and obtain self-check feedback information of each target control system; and controlling the vehicle to enter a drift mode when the self-check feedback information of each of the target control systems is preset conformity information.

8. The vehicle drift control method according to claim 7, when the self-check feedback information of each of the target control systems is the preset conformity information, the method further comprising:

generating a pre-adjustment control instruction; and executing, by at least one pre-adjustment control system among the plurality of target control systems, the pre-adjustment control instruction, to cause the at least one pre-adjustment control system to meet requirements of the drift mode.

9. The vehicle drift control method according to claim 8, wherein the at least one pre-adjustment control system comprises a whole vehicle thermal management system; and the executing, by the at least one pre-adjustment control system among the plurality of target control systems, the pre-adjustment control instruction comprises:

controlling a temperature of each subsystem of the whole vehicle thermal management system within a corresponding preset drift temperature range.

10. The vehicle drift control method according to claim 8, wherein the at least one pre-adjustment control system further comprises a battery management system; and the executing, by the at least one pre-adjustment control system among the plurality of target control systems, the pre-adjustment control instruction comprises:

controlling the battery management system to adjust discharge power of a battery to target discharge power.

11. The vehicle drift control method according to claim 10, wherein the controlling the battery management system to adjust the discharge power of the battery to the target discharge power comprises:

controlling the battery management system to adjust a temperature of a battery module to a first preset temperature range, the first preset temperature range being a temperature range of the battery module with maximum power release efficiency; and obtaining current discharge power, and controlling the battery management system to adjust the current discharge power to the target discharge power, wherein the current discharge power is preset conventional discharge power corresponding to an actual SOC, and the target discharge power is greater than the current discharge power.

12. The vehicle drift control method according to claim 8, wherein the at least one pre-adjustment control system further comprises a front motor controller and a rear motor controller; and the executing, by the at least one pre-adjustment control system among the plurality of target control systems, the pre-adjustment control instruction comprises:

controlling the front motor controller to adjust a temperature of the front axle motor to a second preset temperature range, and adjusting a current motor torque loading/unloading rate of the front motor controller to a target loading/unloading rate; and controlling the rear motor controller to adjust a temperature of the rear axle motor to the second preset temperature range, adjusting a current motor torque loading/unloading rate of the rear motor controller to a target loading/unloading rate, the current motor torque loading/unloading rate being a preset conventional loading/unloading rate, and the target loading/unloading rate being greater than the current motor torque loading/unloading rate.

13. The vehicle drift control method according to claim 8, wherein the at least one pre-adjustment control system comprises a throttle torque control system; and the executing, by the at least one pre-adjustment control system among the plurality of target control systems, the pre-adjustment control instruction comprises:

switching, by the throttle torque control system, a current throttle response curve to a preset power performance response curve.

14. The vehicle drift control method according to claim 7, after the controlling the vehicle to enter the drift mode, the method further comprising:

controlling the vehicle to enter a rear drive control mode, the rear drive control mode preferentially distributing the required whole vehicle torque to the rear axle motor; and controlling the vehicle to enter a four-wheel drive control mode when it is obtained that a vehicle speed reaches a preset vehicle speed threshold, the four-wheel drive control mode being that the torques of the front axle motor and the rear axle motor are controlled based on the required front axle torque and the required rear axle torque respectively.

15. The vehicle drift control method according to claim 1, further comprising:

exiting, when a drift exit instruction is received, a drift mode, and controlling the torques of the front axle motor and the rear axle motor to be reduced by a torque management system and an electronic stability control system until the electronic stability control system monitors that the vehicle is in a stable state.

16. A vehicle drift control system, comprising: a whole vehicle controller and a torque management system connected to the whole vehicle controller, the whole vehicle controller cooperating with the torque management system to perform a vehicle drift control method, the method comprising:

obtaining a required whole vehicle torque and state parameters of a vehicle in response to a drift operation instruction of a user, the state parameters comprising a first vehicle speed, a first yaw rate, and a first mass center sideslip angle;

determining a front axle torque ratio based on the state parameters;

determining a required front axle torque and a required rear axle torque based on the front axle torque ratio and the required whole vehicle torque; and controlling torques of a front axle motor and a rear axle motor based on the required front axle torque and the required rear axle torque respectively.

17. The vehicle drift control system according to claim 16, wherein the determining the front axle torque ratio based on the state parameters comprises:

determining an original front axle torque ratio based on the first vehicle speed;

determining a first front axle torque ratio correction coefficient based on the first yaw rate;

determining a second front axle torque ratio correction coefficient based on the first mass center sideslip angle; and determining the front axle torque ratio based on the original front axle torque ratio, the first front axle torque ratio correction coefficient, and the second front axle torque ratio correction coefficient.

18. The vehicle drift control system according to claim 17, wherein the state parameters further comprise at least one of a first accelerator pedal depth and a first brake pedal depth and, before the determining the front axle torque ratio based on the original front axle torque ratio, the first front axle torque ratio correction coefficient, and the second front axle torque ratio correction coefficient, the method further comprises:

determining a third front axle torque ratio correction coefficient based on the first accelerator pedal depth; and/or determining a front axle torque ratio correction value based on the first brake pedal depth; and the determining the front axle torque ratio based on the original front axle torque ratio, the first front axle torque ratio correction coefficient, and the second front axle torque ratio correction coefficient comprises:

determining the front axle torque ratio based on the original front axle torque ratio, the first front axle torque ratio correction coefficient, the second front axle torque ratio correction coefficient, and at least one of the third front axle torque ratio correction coefficient and the front axle torque ratio correction value.

19. The vehicle drift control system according to claim 16, the method further comprising:

determining a control intensity based on the state parameters, the control intensity being negatively related to a difficulty of an electronic stability control system entering vehicle stability control, and the state parameters comprising a second yaw rate and a second mass center sideslip angle.

20. A vehicle, comprising the vehicle drift control system according to claim 16.

* * * * *